Patented Jan. 2, 1951

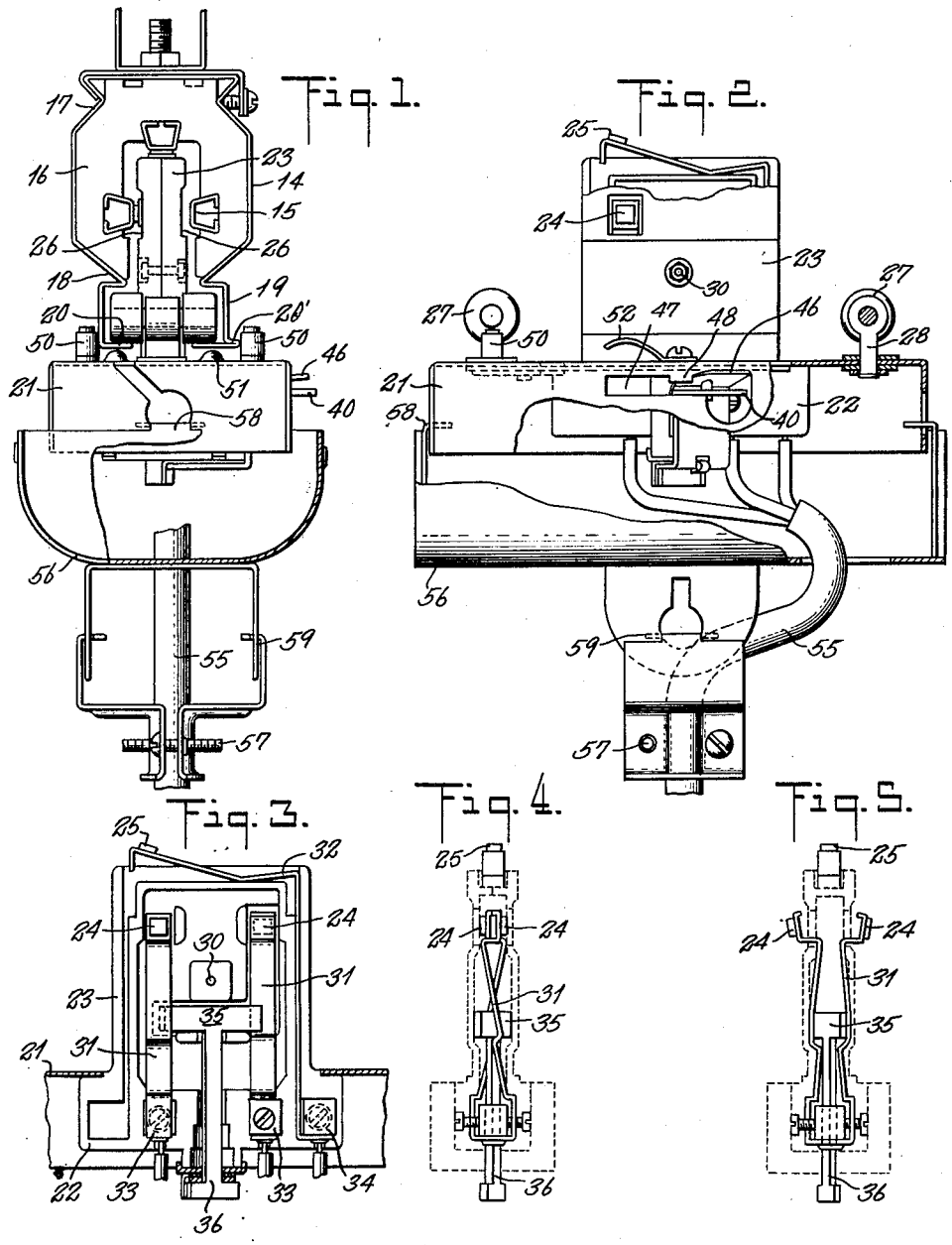

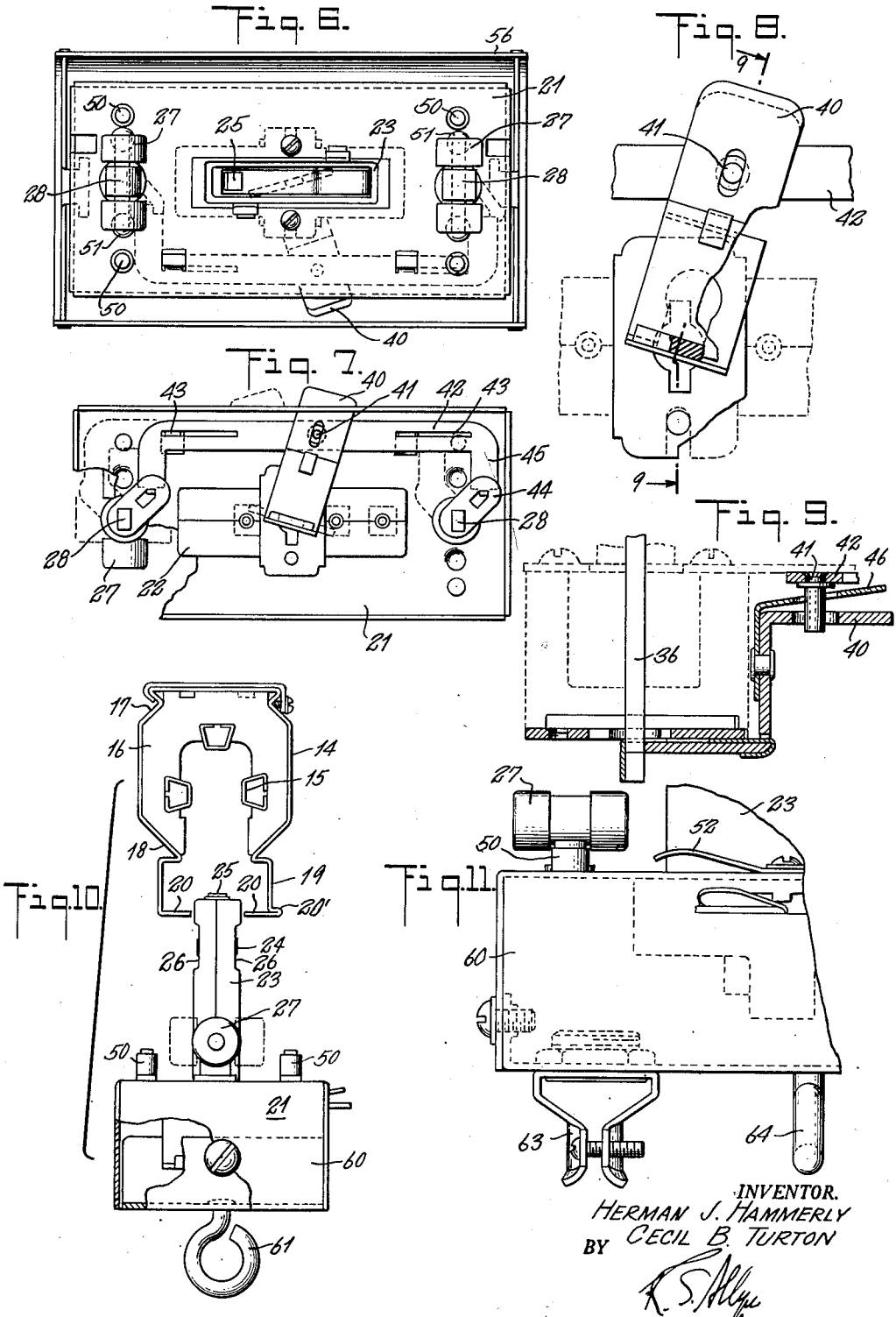

2,536,282

UNITED STATES PATENT OFFICE 2,536,282

TROLLEY TYPE COLLECTOR FOR BUS BAR DUCT SYSTEMS

Herman J. Hammerly and Cecil B. Turton, Plainville, Conn., assignor to The Trumbull Electric Manufacturing Company, Plainville, Conn., a corporation of Connecticut Application February 24, 1949, Serial No. 78,103

10 Claims. (Cl. 191—48)

This invention relates particularly to a branch power take-off device which can be readily moved from point to point of a duct without detaching or removing it from the duct.

One object is to provide a simple form of trolley take-off device which can be applied to or removed from the duct at any point along the length of the duct without the necessity of opening the duct.

Another object is to provide a trolley type of collector which can be used interchangeably with a plug-in type power take-off device in a duct system of the type shown in an application filed by Herman J. Hammerly on Jan. 29, 1949, Ser. No. 73,570.

Another object is to provide a well balanced trolley which will run smoothly in the duct.

Another object is to provide a collector with two pairs of trolley wheels and expandable contacts.

Another object is to provide means for simultaneously alining the trolley wheels and retracting some of the contacts of the collector.

Another object is to prevent unintentional removal of the collector from the duct.

Another object is to provide a trolley that can be polarized so as to avoid the necessity of sectionalizing the system.

Fig. 1 is an end view and partial section showing a duct with its bus bars and a trolley collector involving our invention supported by the duct. This view also shows a suspension clamp for the duct and a form of strain relief for the power take-off.

Fig. 2 is a side view of the trolley collector, parts being broken away and parts shown in section.

Fig. 3 is a side view of the interior of the plug take-off of Figs. 1 and 2 showing the contacts of the plug take-off.

Fig. 4 is an edge view of the plug contacts of the trolley collector showing the insulating housing in dotted lines and the lateral contacts retracted.

Fig. 5 is a view similar to Fig. 4 but showing the lateral contacts spread apart.

Fig. 6 is a top plan view of the trolley collector with the wheels in running position.

Fig. 7 is a bottom plan view of the trolley collector, parts being broken away and parts shown dotted.

Fig. 8 is an enlarged fragmentary view showing the actuating and locking mechanism for the contacts and the supporting rollers or wheels.

Fig. 9 is a cross-sectional view showing the actuating and locking mechanism of Fig. 8, the section being taken on the plane of the line 9—9 of Fig. 8 and also showing in dotted lines the outline of part of the collector body.

Fig. 10 is an end view of a duct and collector of a modified form with a depending eye or hook, the collector being shown in position for insertion into or removal from the duct.

Fig. 11 is a fragmentary side view showing another form of cord or cable clamp and another form of handle.

The duct 14 for which this invention is particularly adapted is formed of sections of sheet metal of suitable lengths such as shown in Figs. 1 and 10 and suitably connected. The bus bars 15 are preferably hollow and of trapezoidal cross-section and supported in U-shaped insulators 16 at intervals along the length of the duct. These bus bars may be arranged in groups of two, three or four and alined bars will be connected by suitable jacks (not shown). In the form shown in Fig. 1 there are three bus bars 15.

The insulators are secured between the grooved or indented portions 17 and 18 of the duct above a channel-like portion of the duct formed by the side walls 19, 19 and the inturned flanges 20, 20.

The carriage 21 has secured to it an insulating body 22 with a plug-in extension 23 which carries the contacts such as 24, 24 and 25, the contacts 24, 24 being guarded in grooves 26, 26.

The flanges 20 constitute tracks for the wheels 27, which are arranged in pairs, each pair rotatably mounted on a shaft 28, at opposite ends of the carriage 21 so that when the wheels are in alinement the plug can be inserted into the duct between the flanges and when rotated crosswise the carriage may travel along the tracks.

In the form shown, the plug-in device is formed of two parts held together for instance by one or more screws or rivets 30 and the contacts 24, 24 and 25 and their spring supports 31, 31 and 32 and their terminals 33, 33 and 34, respectively, are mounted in suitable recesses or grooves between the two parts. The end contact 25 is adapted to engage the center bus bar when the device is inserted into the duct and the side contacts 24, 24 are normally retracted when not in place, as shown in Fig. 4, by the spring bias of the arms 31. Between the arms 31, 31 is mounted a cam 35 carried by the oscillatable shaft 36 so that by turning shaft 36, the contacts 24 may be projected laterally when in the duct to engage the lateral bus bars.

The rotation of the wheels from the alinement relation of Fig. 10 and the projection of the side contacts is simultaneously effected by the lever 40 which is connected to the lower end of shaft 36 and has a pin and slot connection 41 with a bar 42 which is slidably guided by lugs 43 on the lower face of the carriage. Each of the wheel shafts 28 has an arm 44 connected to an offset 45 on bar 42 so that when the lever 40 is turned the bar 42 moves and rotates the two wheel shafts with the attached wheels.

In order to avoid accidental turning of the lever 40, we provide a spring latch 46 carried by the end of the lever 40 which turns with the lever in the slot 47 in one side of the carriage. A lug 48 in the center of this slot normally prevents the lever and catch from turning. In order to turn the lever and attached parts it is only necessary to depress the catch so as to clear the lug.

The top of the carriage is provided with guide rollers 50 which take up lateral pressure by the carriage on the flanges of the duct.

By providing an outer flange 20' at one side of the duct and locating the rollers on one side of the carriage further from the center than the rollers at the other side by an amount approximately equal to the width of flange 20', it is possible to polarize the carriage so that some of the carriages used in the system must be used to take the load from one polarity and some from the opposite polarity.

The projections 51 on top of the carriage serve to prevent the carriage from tilting and the spring 52 serves to ground the carriage on the duct.

In the form shown in Fig. 2, the cable 55 has three conductors connected to the terminals 33 and 34 and is clamped to a tilting cradle 56 by clamp screws 57. This cradle is hinged at 58 to the carriage so as to avoid undesirable bends in the cable. A hinge-joint 59 may be interposed between the clamp 57 as an additional precaution.

In Fig. 10, we have shown a simple form of connection to the carriage where a box-like body 60 carries any form of cable connection such as a hook or eye 61. This serves as a handle for moving the carriage along the duct.

Fig. 11 shows a carriage with a cable clamp 63 secured to it and a simple form of handle or bail 64 for convenience in moving the carriage from place to place.

It will be understood that changes in details might be made without departing from the principle of the invention.

We claim:

1. A trolley collector having a carriage with an insulating body having exposed contacts mounted in said body and a pair of riding wheels pivoted as a unit at each end of the carriage so that they can be brought into alinement for insertion into a slotted duct and turned to bring the wheels to run on tracks inside the duct, means for bodily turning both pairs of wheels simultaneously and means for latching said turning means.

2. A trolley collector having a carriage with an insulating body having contacts mounted in said body and a pair of riding wheels pivoted as a unit at each end of the carriage so that they can be brought into alinement for insertion into a slotted duct and turned to bring the wheels to run on tracks inside the duct, means for protruding said contacts outside said body and means for bodily turning both pairs of wheels simultaneously.

3. A trolley collector for a bus bar duct system comprising a carriage having an insulating body with a spring contact supported within said body and adapted to protrude at one side, a pair of wheels pivoted as a unit at each end of the carriage and means for bodily turning all of said units to bring the wheels into or out of alinement and for simultaneously retracting or protruding said contact into and away from said body.

4. In a trolley collector, a carriage having a pair of wheels pivoted as a unit at each end, a bar extending longitudinally of the carriage having means of connection with said pivoted units, a lever connected to said bar for bodily turning said units and a spring-pressed latch coacting with said lever and said carriage for preventing accidental movement of said lever.

5. A trolley collector for a bus bar duct system comprising a carriage having an insulating body with a spring contact supported within said body and adapted to protrude at each side, a pair of wheels pivoted as a unit to each end of the carriage and means for turning all of said units to bring the wheels into alinement and for simultaneously retracting said contacts into said body.

6. In a trolley collector, a carriage having a pair of wheels pivoted at each end, a plug carried by said carriage and having spring contacts, a cam for moving said contacts, a bar extending longitudinally of the carriage having means of connection with said pivoted wheels, a lever connected to said bar for turning said wheels and having means for rotating said cam.

7. A trolley collector comprising a carriage having an opening, an insulating body mounted at one face of said carriage and having an extension extending through said opening, spring contact arms having circuit terminals fixedly housed in said body and having contact tips, the contact tip of one arm being adapted to be exposed at one side face of said extension, a cam and means for manually turning said cam for actuating said latter arm, the contact tip of another arm being exposed at the outer end of said extension.

8. A trolley collector for a bus bar duct system comprising a carriage, wheels at each end of the carriage for supporting the collector on flanges of a duct, an insulating body carried by the carriage having a plug-in extension formed of two parts adapted to be inserted between the flanges of a duct, contact arms housed between the parts of said body and having fixed circuit terminals, one contact arm having a contact tip located at one face of the extension and another contact arm having a contact tip located at the opposite face of the extension and manually operable means engaging said arms for causing the contact tips to be projected from the opposite faces of said extension and to be retracted to housing position.

9. A trolley collector for a bus bar duct system comprising a carriage, wheels at each end of the carriage for supporting the collector on flanges of a duct, an insulating body carried by the carriage having a plug-in extension formed of two parts adapted to be inserted between the flanges of a duct, contact arms housed between the parts of said body and having fixed circuit terminals, one contact arm having a contact tip located at one face of the extension and another contact arm having a contact tip located at the opposite face of the extension and manually operable means engaging said arms for causing the contact tips to be projected from the opposite faces of said extension and to be retracted to housing position, and a third contact arm in the extension having a contact tip exposed at the outer end of the extension.

10. A trolley collector for a bus bar duct system comprising a carriage, a pair of wheels at each end and centrally of the carriage for supporting the carriage at four points, a two-piece insulating housing having a base and an extension with openings in the extension, circuit terminals in said base, spring arms disposed between the parts of said extension and having their ends fixed to said terminals, and having their other ends free, contacts on the free ends of said arms adapted to be projected and retracted through said openings, and means in common for simultaneously bodily moving the wheels as a unit into and out of registry with the slot in a duct and projecting or retracting the contacts so as to permit the wheels and contacts to pass through the slot in a duct and to ride on the bus duct and to contact the bus bars in the duct, respectively.

HERMAN J. HAMMERLY.
CECIL B. TURTON.

REFERENCES CITED

The following references are of record in the file of this patent:

UNITED STATES PATENTS

| Number | Name | Date |
| --- | --- | --- |
| 2,117,552 | Frank et al. | May 17, 1938 |
| 2,186,376 | Frank et al. | Jan. 9, 1940 |
| 2,322,640 | Jackson et al. | June 22, 1943 |